Patented Apr. 5, 1938

2,113,301

UNITED STATES PATENT OFFICE 2,113,301

PREPARATION OF CELLULOSE ESTERS HAVING A HIGH CONTENT OF PROPIONYL OR BUTYRYL

Howard S. Gardner, Jr., Rochester, N. Y., assignor, by mesne assignments, to Eastman Kodak Company, Jersey City, N. J., a corporation of New Jersey No Drawing. Application April 3, 1936, Serial No. 72,663

8 Claims. (Cl. 260—101)

The present invention relates to a process of preparing cellulose esters containing a large amount of propionyl or butyryl in which cellulose is pretreated with a liquid containing water and a large proportion of propionic or butyric acid, after which the esterifying ingredients are mixed therewith.

In the preparation of cellulose esters containing a large amount of acetyl, the cellulose employed therein can be pretreated with a pretreating bath in which acetic acid predominates. The acetic acid readily activates the cellulose so that there are no difficulties connected with the pretreatment in the preparation of cellulose esters of this nature. If, however, a cellulose ester containing a large amount of propionyl or butyryl is to be prepared, the amount of acetic acid which may be present in the pretreatment and esterification is restricted and the cellulose is not activated to a very great extent.

This difficulty might be overcome by pretreating the cellulose with a bath in which acetic acid predominates and then pressing off the acetic acid therefrom. This would have the disadvantage, however, that a great amount of handling is necessary and that even with pressing, there would nevertheless be considerable acetic acid left on the cellulose so that the final product would contain acetyl, the amount of which would depend upon the proportions of the propionyl or butyryl-containing ingredients in the esterification bath employed. To obtain a very high content of propionyl or butyryl, it would be necessary to use large proportions of the propionyl or butyryl supplying ingredients to counteract the effect of the acetic acid present. Thus, by this method, larger amounts of these more expensive materials would be necessary, especially if the preparation of an ester approaching a tripropionate or tributyrate were desired.

As the acetic acid content of the pretreatment liquid decreases, increased difficulties are encountered in the esterification and the esterification dope tends to contain more grain, haze and fiber. For instance, one cannot make a satisfactory cellulose tripropionate with a pretreatment of the cellulose with a bath consisting of propionic acid or a satisfactory tributyrate by pretreatment with a bath consisting of butyric acid. Also, in the case of the mixed esters, such as cellulose acetate butyrate of more than 30% butyryl content, a satisfactory ester cannot be obtained by pretreating the cellulose with a mixture consisting of 70% butyric acid and 30% acetic acid.

One object of my invention is to provide a process for the preparation of cellulose esters containing large amounts of fatty acyl groups of 3-4 carbon atoms in which both the pretreatment and esterification may be carried out in the same vessel, with only a minimum of handling. Another object of my invention is to provide a process for preparing a cellulose ester containing a large amount of fatty acyl groups of 3-4 carbon atoms in which a clear brilliant dope is obtained rather than a grainy, hazy or fibrous dope, the former denoting a uniform product. Another object of my invention is to provide a pretreatment step for the preparation of cellulose esters containing large amounts of fatty acyl groups of 3-4 carbon atoms in which there is nothing present in the pretreatment bath to cause degradation of the cellulose or to counteract the swelling action of the pretreatment liquid upon the cellulose.

I have found that by the addition of water to the pretreating acid that the cellulose is readily activated as evidenced by a greatly improved appearance in the product formed, indicated by increased brilliance and decreased haze and fiber in dopes prepared therefrom. The amount of water employed in the pretreatment liquid may vary from 5 to 20% or more based on the weight of the cellulose. This water may be supplied by either adding it directly to the pretreatment liquid or by supplying a high-moisture content to the cellulose prior to its addition to the pretreating liquid. This moisture may be supplied to the cellulose by exposing it to air having a high humidity or by subjecting it to the action of wet steam for a few minutes before it is added to the pretreating liquid. The more satisfactory method of incorporating water is the addition of the water directly to the pretreating liquid as the percentage of moisture admits more accurate control when added in this manner.

The pretreatment of cellulose with a mixture of butyric and acetic acid together with a catalyst and a small amount of water has been proposed. However, when a catalyst is present, the pretreatment has the following disadvantages:

1. The ingredients of the pretreating liquid may be incompatible, in which case an additional material must be added in order to homogenize the constituents.

2. The presence of a catalyst in the pretreating liquid counteracts the swelling action of the water therein upon the cellulose.

3. The presence of a catalyst in the pretreating liquid causes degradation or breakdown of the cellulose.

4. When a bath of this nature is used, the pretreating liquid is pressed out prior to subjecting the cellulose to the acylating bath which results in much handling, thus increasing the cost of preparing an ester by this method.

5. The pressing out operation, if used, renders uncertain the amount of catalyst left on the cellulose for esterification, so that control during esterification is difficult, due to variations in catalyst concentration.

In my process all of these disadvantages are avoided. The amount of water which is to be employed may be varied by the individual operator as desired. As a general rule, an increase in the percentage of water employed is desirable upon an increase in the proportion of higher fatty acid which is employed in the pretreating liquid. If no water at all is employed, the esterification mixture especially in the preparation of a tripropionate or a tributyrate will result in a slurry containing unesterified or incompletely esterified cellulose. If only a small amount of water is employed in the pretreatment, the pretreating liquid is less effective than where sufficient water is employed, and a hazy product would result. In the preparation of the butyryl esters in which butyric acid is employed in the pretreatment, it is desirable to employ a larger amount of water than would be employed in a pretreatment in which propionic acid was the predominating acid. In a pretreatment, in accordance with my invention, the addition of the water can be increased to as high as 50%, based on the weight of the cellulose, but the degree of improvement due to the added water is less than where a small proportion of water is used. Also the additional amount of anhydride necessary which must be added in the esterification mixture, to compensate for the high amount of water which is present, would be uneconomical in the usual commercial process, unless there would be some advantage which would justify the increased cost.

Upon the addition of the anhydride and catalyst after the pretreatment of the cellulose, there will be a rise in temperature due to the reaction between the anhydride and the water. In order to minimize the generation of heat by this reaction, it is desirable to add the major portion of the anhydride at the end of the pretreatment after which the mixture is cooled. When the pretreated mass has been cooled to the desired temperature such as 45° F., only sufficient catalyst should be added to bring about the reaction between the anhydride and the water and the mass should then again be cooled before the addition of the rest of the catalyst. In this way the heat generated by the reaction between anhydride and water is dissipated prior to the start of the esterification proper so that the temperature of the esterification reaction can be controlled without the influence of the heat generated by the reaction between water and anhydride.

The following examples illustrate processes which embody my invention:

*Example I*

Twenty-five pounds of cotton linters having a moisture content of approximately 2% were pretreated for four hours at 150° F. with 115 pounds of propionic acid to which five pounds of water has been added. At the end of the pretreatment, 90 pounds of propionic anhydride was added and the mass was cooled to 45–50° F. A catalyst mixture containing 450 cc. of 96% sulfuric acid, 30 pounds of propionic anhydride and 10 pounds of propionic acid, which had been previously prepared, was cooled to 35° F. Four pounds of this catalyst mixture was added. After the reaction between the anhydride and the water had taken place, as indicated by no further rise in temperature, the mass was again cooled, whereupon the rest of the catalyst mixture was added. The reaction temperature was kept below 55° F. during the entire esterification. After about 50 hours, a brilliant dope was obtained of medium viscosity and containing only traces of grain and fiber. The ester may be precipitated from the esterification mixture by, for instance, pouring into water or methyl alcohol or it may be hydrolyzed as desired and then precipitated. The product, in either case, when dissolved in an organic solvent, such as acetone or ethylene chloride, gives a solution that is quite clear and which will form a flexible skin or sheet of good appearance when coated out from that solution, on to film forming surface. The unhydrolyzed product formed is a cellulose tripropionate.

*Example II*

Four hundred and fifty pounds of cotton linters having a moisture content of approximately 2% were pretreated by adding a mixture of 1500 pounds of propionic acid, 500 pounds of acetic acid and 25 pounds of water and allowing to stand for four hours at 100° F.

1300 lbs. of 90% propionic anhydride and 450 lbs. of acetic anhydride were then added and the mixture was cooled to 45° F. A mixture of 750 lbs. of proprionic acid and 8,000 cc. of sulfuric acid which had been cooled to 45° F. was then added. The temperature was allowed to rise during the course of 6 hrs. to a maximum of 80° F. where it was kept until a clear highly viscous dope, free from grain, was obtained.

The ester was then hydrolyzed by adding 1000 lbs. of 50% acetic acid to the dope and allowing it to stand for 100 hrs. at 100° F. The ester was then precipitated out, washed, dried and analyzed as in the preceding example. It was found to have a propionyl content of 32% and an acetyl content of 10%.

I claim:

1. A process of preparing cellulose esters containing a predominating proportion of fatty acid groups of 3–4 carbon atoms, which comprises pretreating cellulose in the absence of an acylation catalyst with a liquid containing a predominating proportion of fatty acid of 3–4 carbon atoms, which liquid contains 5–20% of water based on the weight of the cellulose in addition to the water inherently present in the cellulose and then esterifying the cellulose in an esterification bath in which the esterifying acyl therein is largely fatty acid groups of 3–4 carbon atoms.

2. A process of preparing cellulose esters containing a predominating proportion of propionyl in which the cellulose to be acetylated is pretreated in the absence of an acylation catalyst with a liquid in which propionic acid predominates, which liquid contains 5–20% of water based on the weight of the cellulose in addition to that inherently present in the cellulose and then esterifying the cellulose with an esterification mixture in which the esterifying acyl consists mainly of propionyl groups.

3. A process of preparing a cellulose ester containing a predominating proportion of propionyl in which the cellulose for acylation is pretreated in the absence of an acylation catalyst with a liquid in which the propionic acid predominates, which liquid contains approximately 5% of water based on the weight of the cellulose in addition to that inherently present in the cellulose and then esterifying the cellulose with an esterification mixture in which the esterifying acyl consists mainly of propionyl groups.

4. A process of preparing cellulose esters containing a predominating proportion of butyryl in which the cellulose to be acetylated is pretreated in the absence of an acylation catalyst with a liquid in which butyric acid predominates, which liquid contains 5-20% of water based on the weight of the cellulose in addition to that inherently present in the cellulose and then esterifying the cellulose with an esterification mixture in which the esterifying acyl consists mainly of butyryl groups.

5. A process of preparing cellulose acetate propionate in which the cellulose for acylation is pretreated in the absence of an acylation cataylst with a liquid consisting of propionic acid and a minor amount of acetic acid, which liquid contains 5-20% of water based on the weight of the cellulose in addition to that inherently present in the cellulose and then esterifying the cellulose in an esterification mixture in which the esterifying acyl is largely propionyl.

6. A process of preparing cellulose acetate butyrate in which the cellulose for acylation is pretreated in the absence of an acylation catalyst with a liquid consisting of butyric acid and a minor amount of acetic acid, which liquid contains 5-20% of water based on the weight of the cellulose in addition to that inherently present in the cellulose and then esterifying the cellulose in an esterification mixture in which the esterifying acyl is largely butyryl.

7. A process of preparing cellulose esters containing a predominating proportion of fatty acid groups of 3-4 carbon atoms, which comprises adding water to a pretreating liquid essentially consisting of fatty acid groups of 3-4 carbon atoms in an amount 5-20% of the cellulose which is to be pretreated, treating the cellulose therewith until the desired activation has occurred and then esterifying the cellulose in an esterification bath in which the esterification acyl therein is predominately fatty acid groups of 3-4 carbon atoms.

8. A process of preparing a cellulose ester containing a predominating proportion of propionyl, which comprises adding water to propionic acid in an amount 5-20% of the cellulose which is to be pretreated therewith, then treating the cellulose until it is activated to the desired extent and subsequently esterifying that cellulose in an esterification bath in which the esterifying acyl therein is largely fatty acid groups of 3-4 carbon atoms.

HOWARD S. GARDNER, Jr.